United States Patent
Rabe

(10) Patent No.: US 6,640,184 B1
(45) Date of Patent: Oct. 28, 2003

(54) METHOD AND APPARATUS FOR PROVIDING LOCATION INFORMATION

(75) Inventor: Duane Carl Rabe, Hawthorn Woods, IL (US)

(73) Assignee: Motorola, Inc., Schaumburg, IL (US)

( * ) Notice: Subject to any disclaimer, the term of this patent is extended or adjusted under 35 U.S.C. 154(b) by 116 days.

(21) Appl. No.: 09/710,290

(22) Filed: Nov. 10, 2000

(51) Int. Cl.[7] .................. G01C 21/00; G08G 1/123; H04Q 7/20

(52) U.S. Cl. .................. 701/207; 701/213; 701/215; 340/989; 340/990; 340/991; 340/993; 455/456; 455/457

(58) Field of Search ................ 701/207, 213, 701/215; 340/989, 990, 991, 993; 455/456, 457

(56) References Cited

U.S. PATENT DOCUMENTS

| | | | | |
|---|---|---|---|---|
| 6,138,003 A | * | 10/2000 | Kingdon et al. | 340/5.74 |
| 6,175,740 B1 | * | 1/2001 | Souissi et al. | 342/357.01 |
| 6,195,557 B1 | * | 2/2001 | Havinis et al. | 455/433 |
| 6,219,557 B1 | * | 4/2001 | Havinis | 455/414 |
| 6,226,589 B1 | * | 5/2001 | Maeda et al. | 340/991 |
| 6,295,454 B1 | * | 9/2001 | Havinis et al. | 455/456 |
| 6,311,069 B1 | * | 10/2001 | Havinis et al. | 455/414 |
| 6,327,535 B1 | * | 12/2001 | Evans et al. | 119/201 |

* cited by examiner

*Primary Examiner*—William A. Cuchlinski, Jr.
*Assistant Examiner*—Brian J. Broadhead
(74) *Attorney, Agent, or Firm*—Shigeharu Furukawa

(57) ABSTRACT

A method and apparatus for providing location information is provided. A location request is received (102) from a source. A location of a mobile device is determined (104). A plurality of location descriptions corresponding to the location are determined (105). A location description is selected (107) from among the location descriptions. The location description is provided (108) to the source of the location request.

36 Claims, 11 Drawing Sheets

METHOD AND APPARATUS FOR PROVIDING LOCATION INFORMATION

TECHNICAL FIELD OF THE INVENTION

The invention relates generally to a method and apparatus for providing location information and, more specifically, to a method and apparatus for providing location information regarding the location of a mobile device to a remotely-located device.

BACKGROUND OF THE INVENTION

Technology has been developed to aid in the determination of a location. For example, the global positioning system (GPS) and GLONASS satellites allow the location of an object to be determined using receiving apparatus to receive the signals from the satellites. However, the receiving apparatus typically provides only latitude and longitude values. Some receiving apparatus is capable of displaying a map and allows the location to be displayed on the map.

While the receiving apparatus allows the user of the receiving apparatus to know his or her location, it is often not the user who desires to know the user's location, but someone else who is remotely located from the user. The user may find it beneficial for others (e.g., family members and co-workers) to be able to determine the user's location. However, because of privacy concerns, the user may not want his or her location to be made available to others all others in an unrestricted manner. Thus, it would be desirable to enable a user to control the distribution of information about his or her location and to provide a method and apparatus related thereto.

DETAILED DESCRIPTION OF A PREFERRED EMBODIMENT

A method and apparatus for providing location information is described. A location request is received from a source. A location of a mobile device is determined. A plurality of location descriptions corresponding to the location are determined. A location description is selected from among the location descriptions. The location description is provided to the source of the location request.

Figure 1:
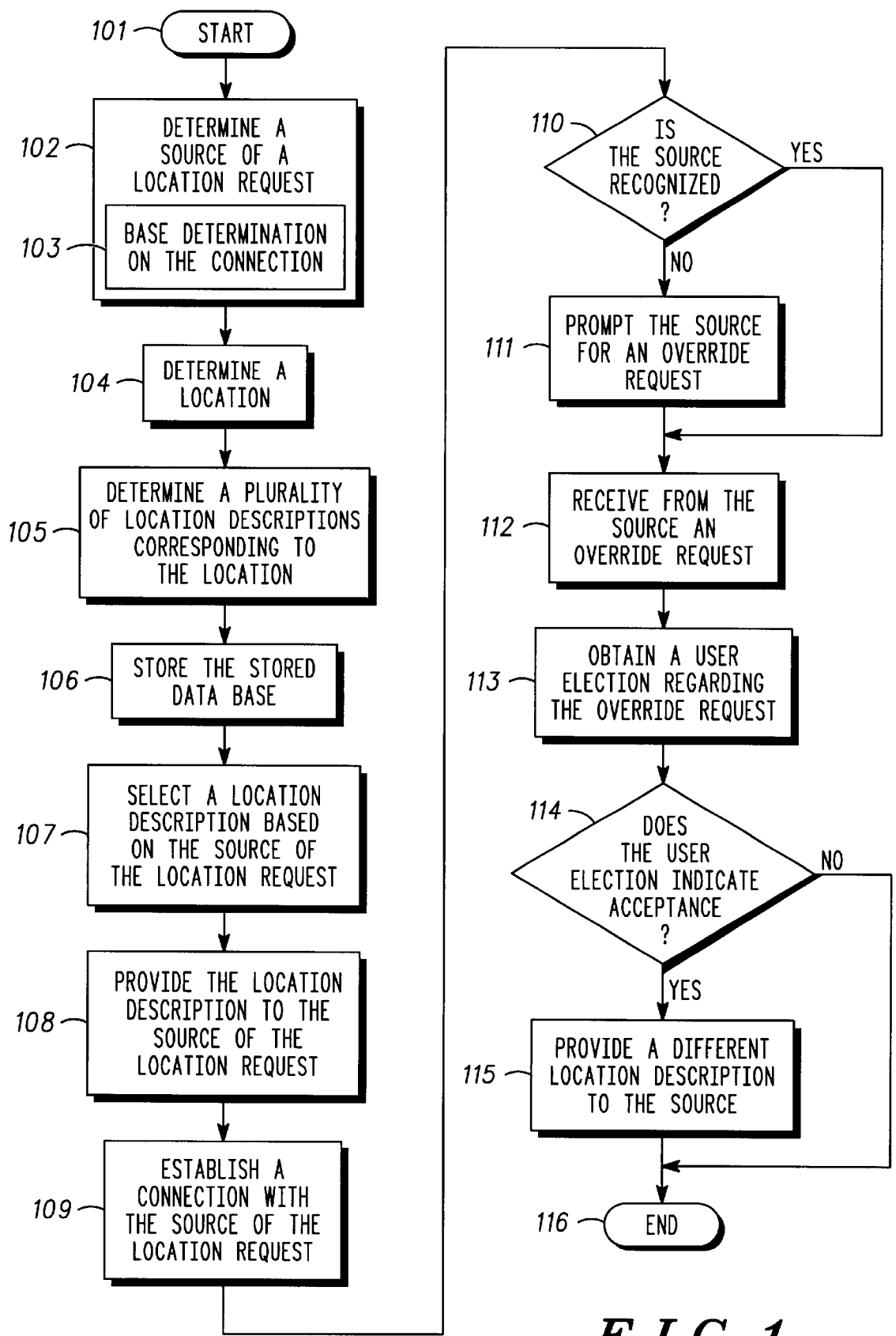
FIG. 1 is a flow diagram illustrating a method for providing a location description in accordance with an embodiment of the invention.

FIG. 1 is a flow diagram illustrating a method for providing a location description in accordance with an embodiment of the invention. The method includes several steps to respond to a location request. The method begins in step 101 and continues to step 102. In step 102, a source of the location request is determined. The source of the location request may be determined using a variety of technologies, for example, based on an internet protocol (IP) address of the source of the location request, based on a cryptographically signed request (e.g., a digital signature using a public-key cryptosystem), based on a telephone number of the source of the location request (e.g., Caller ID or other calling line identification), or based on voice recognition of the source. Step 102 may optionally include step 103. In step 103, the source of the location request is determined based on the connection, for example, using the IP address or Caller ID associated with the connection.

In step 104, a location of a mobile device is determined. The location of the mobile device may be determined using systems such as satellite-based systems (e.g., GPS or GLONASS). Technologies such as radio frequency identification (RFID) systems and infrared systems may be used either alone or in conjunction with satellite-based systems. In step 105, a plurality of location descriptions corresponding to the location are determined. The location descriptions may include varying levels of geographic resolution. For example, location descriptions for a location at varying levels of geographic resolution may include state, county, city, neighborhood, street address, and room number.

In step 106, at least a portion of the plurality of location descriptions is stored as a stored database. The stored database (or a portion thereof) may be stored at a device located at the location. For example, a mobile telephone may have a stored database and may use the stored database to obtain an appropriate location description to respond to location requests in a peer-to-peer mode. Alternatively, at least a portion of the stored database may be stored at a database server located remotely from the location. The database server may be consulted for location descriptions. For example, the device located at the location may include location descriptions for locations within a home service (or frequently visited) area in which the device is usually located, but the device may consult the database server for location descriptions when the device is located outside of the home service (or frequently visited) area.

In step 107, a location description is selected based on the source of the location request. A location description may be selected to be most meaningful to a particular source of the location request. For example, a location description referring to a particular office or corporate facility may be provided to a source within a corporation, while a more general location description, such as "at work" or "at Company_Name" (Company_Name being the proper name for an entity) may be provided to sources outside the corporation. Similarly, to preserve privacy, a more specific location description may be provided to trusted sources, while a more general location description may be provided to sources that are not trusted.

In step 108, the location description is provided to the source of the location request. The location description may be communicated to the source of the location request along the same path over which the location request was communicated or over a different path.

In step 109, a connection is established with the source of the location request. The connection may be initiated by a device at the location. In step 110, a determination is made as to whether or not the source of the location request is recognized. If the source is recognized, the method continues in step 112. If the source is not recognized, the method continues in step 111. In step 111, when the source of the location request is unrecognized, the source of the location request is prompted for an override request.

In step 112, an override request is received from the source of the location request. The override request requests that the selected location description be overridden and a different location description be provided.

In step 113, a user election is obtained regarding the override request. The user election indicates whether or not the user elects to allow the selected location description to be overridden and a different location description to be provided.

In step 114, a determination is made as to whether or not the user election indicates acceptance of the override request. If the user election indicates that the user does not accept the override request, the method ends in step 116. If the user election indicates that the user does accept the override request, the method continues to step 115. In step 115, a different location description is provided at a different level of geographic resolution to the source of the location request when the user election indicates acceptance of the override request. Following step 115, the method ends in step 116.

Figure 2:
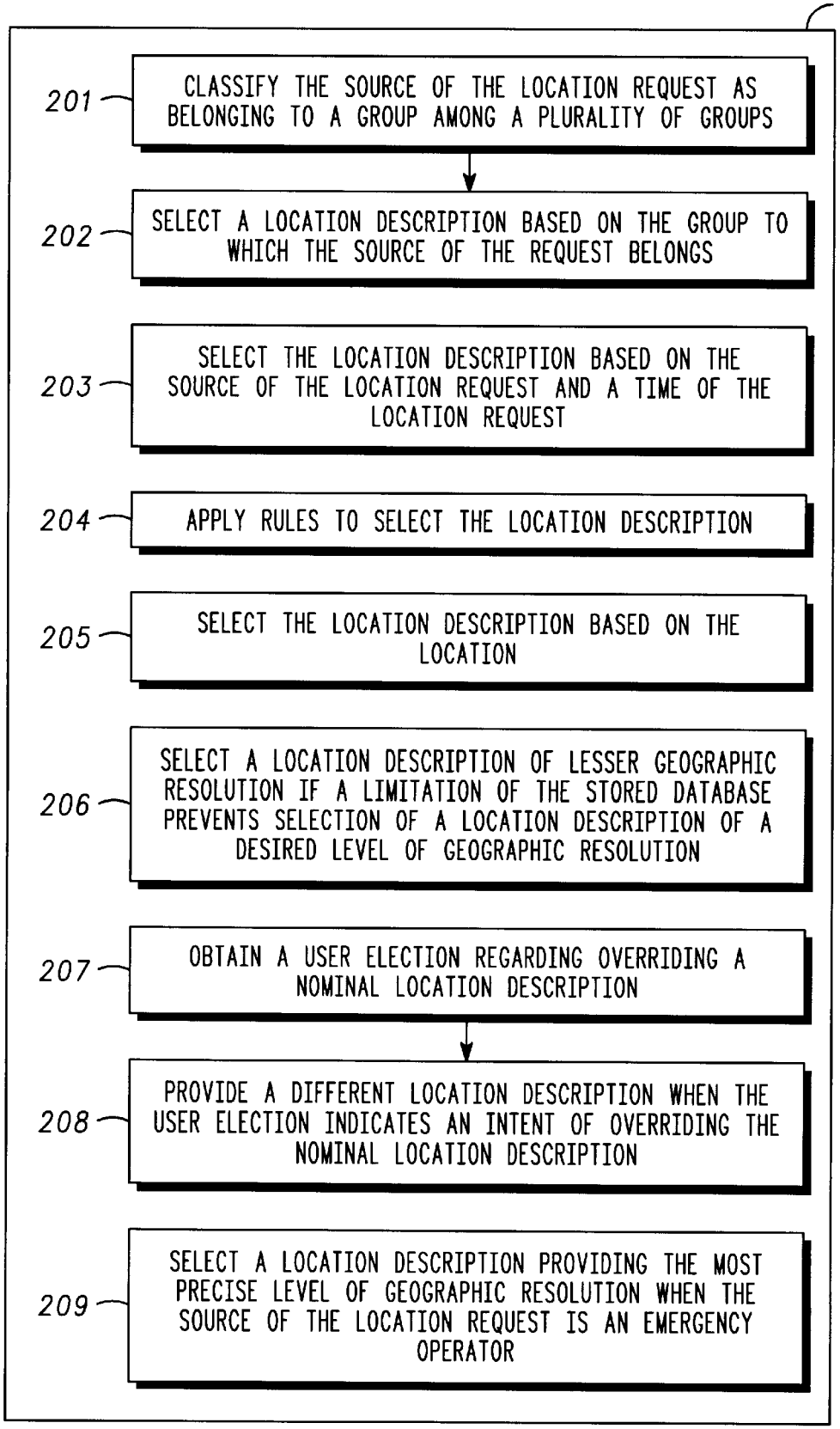
FIG. 2 is a diagram illustrating optional embodiments of step 107 of FIG. 1.

FIG. 2 is a diagram illustrating optional embodiments of step 107 of FIG. 1. Steps 201 and 202 illustrate an embodiment of the step of selecting a location description based on the source of the location request. In step 201, the source of the location request is classified as belonging to a group from among a plurality of groups. In step 202, a location description is selected based on the group to which the source of the request belongs.

Step 203 illustrates an embodiment of the step of selecting a location description based on the source of the location request wherein the location description is selected based on the source of the location request and a time of the location request. For example, a different location description may be selected after work hours than would be selected during work hours. Thus, a temporal aspect may be considered in the selection of a location description.

Step 204 illustrates an embodiment of the step of selecting a location description based on the source of the location request wherein rules are applied to select the location description. Thus, rule-based selection may be used to select a location description.

Step 205 illustrates an embodiment of the step of selecting a location description based on the source of the location request wherein a location description is selected based on the location, a source location of the source of the location request, and a limitation of a stored database. Step 205 may also be practiced using step 206. According to step 206, if a limitation of the stored database prevents the selecting of the location description of a desired level of geographic resolution, a location description of lesser geographic resolution may be selected. Thus, the level of geographic resolution may be adaptively selected based on a limitation of the stored database.

Steps 207 and 208 illustrate an embodiment of the step of selecting the location description based on the source of the location request. In step 207, a user election regarding overriding a nominal location description is obtained. In step 208, a different location description at a different level of geographic resolution is provided to the source of the location request when the user election indicates an intent of overriding the nominal location description. It may be desirable to automatically prompt for manual override when a location request is associated with a call originated by user of the device at the location. For example, if the user of the device at the location originates a call to the source of the location request, the user of the device at the location may be automatically prompted for override of the location request. The user of the device at the location may be more inclined to override the location request, for example to allow a more detailed level of geographic resolution since the user of the device presumably knows whom they have called and is more likely to trust such a source of a location request.

A location description may be provided along a data path associated with a voice path of the call originated by the user of the device at the location. Thus, a user may provide a location description to a party with whom the user is communicating in a voice call.

Step 209 illustrates an embodiment of the step of selecting the location description based on the source of the location request. The location description providing the most precise level of geographic resolution is selected when the source of the location request is an emergency operator. If a rule-based selection technique is employed, an emergency operator may be automatically exempted from rules and provided with full (e.g., the most detailed) location information.

If location information pertaining to the source of the location request is passed along with the location request, a response to the location request that is most meaningful to source of the location request may be selected. For example, when the source of the location request is in close proximity to the location for which the location request pertains, a location description at a more detailed level of geographic resolution would be appropriate. However, if the source of the location request is far from the location, a location description at a less detailed level of geographic resolution might be preferred.

A higher or lower resolution option may be provided for trusted sources not satisfied with the level of the location description automatically provided to them. Thus, in such an implementation, the user of the device at the location need not be disturbed to provide a user election to an override request when the source is a trusted source.

Figure 3:
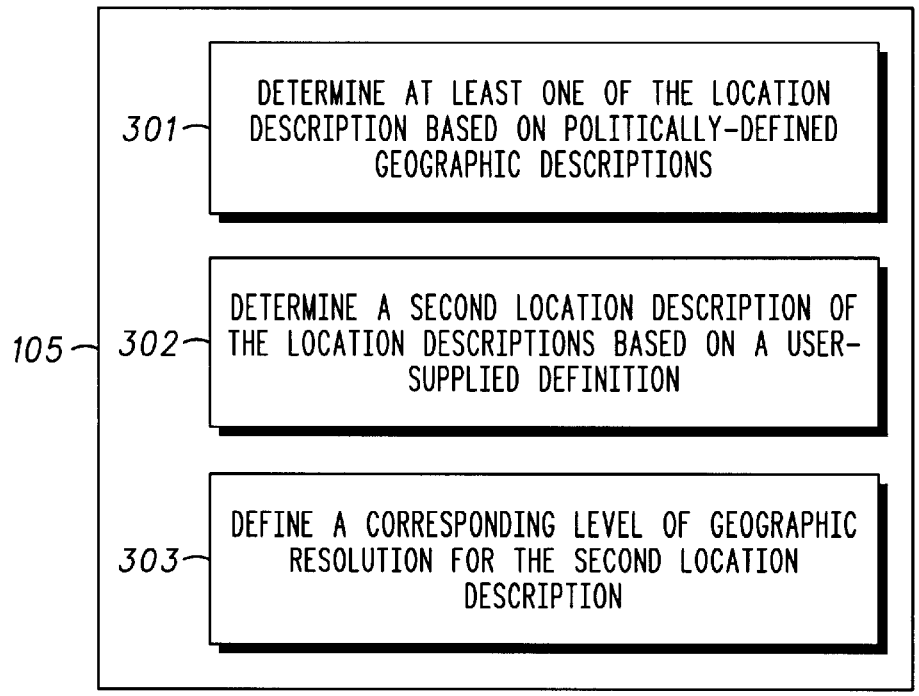
FIG. 3 is a diagram illustrating optional embodiments of step 105 of FIG. 1.

FIG. 3 is a diagram illustrating optional embodiments of step 105 of FIG. 1. Step 301 illustrates an embodiment of the step of determining the plurality of location descriptions corresponding to the location. In step 301, at least one of the location descriptions is determined based on politically-defined geographic descriptions. For example, levels of location descriptions for a location may include a country, a state, a county, a city, a street address, and a room.

Step 302 illustrates an embodiment of the step of determining the plurality of location descriptions corresponding to the location. In step 302, a second location description of the location descriptions is determined based on a user-supplied definition. For example, in addition to politically-defined geographic descriptions, a user may define location descriptions such as "home," "Company_Name Schaumburg," "Company_Name Ed Blustein," a neighborhood, etc, in which Company_Name is the proper name for an entity. Thus, specified regions may be denominated. Step 303 may also be practiced in conjunction with step 302. In step 303, a corresponding level of geographic resolution may be defined for the second location description. Thus, specified regions may be fit into a hierarchy of location descriptions at different levels of geographic resolution at the time they are defined.

Figure 4:
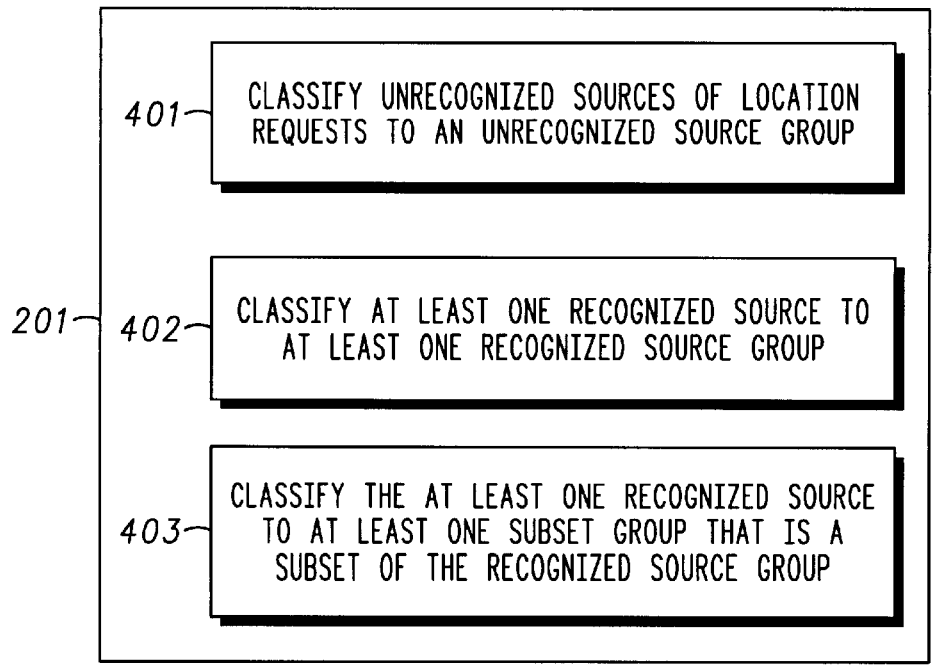
FIG. 4 is a diagram illustrating optional embodiments of step 201 of FIG. 2.

FIG. 4 is a diagram illustrating optional embodiments of step 201 of FIG. 2. Step 401 illustrates an embodiment of the step of classifying the source of the request as belonging to a group from among a plurality of groups. In step 401, unrecognized sources of location requests are classified to an unrecognized source group.

Step 402 illustrates an embodiment of the step of classifying the source of the request as belonging to a group from among a plurality of groups. In step 402, at least one recognized source is classified to at least one recognized source group. Step 402 may be practiced in conjunction with step 403. In step 403, the at least one recognized source is classified to at least one subset group that is a subset of the recognized source group. For example, the subset group may include such members as co-workers or family members.

Figure 5:
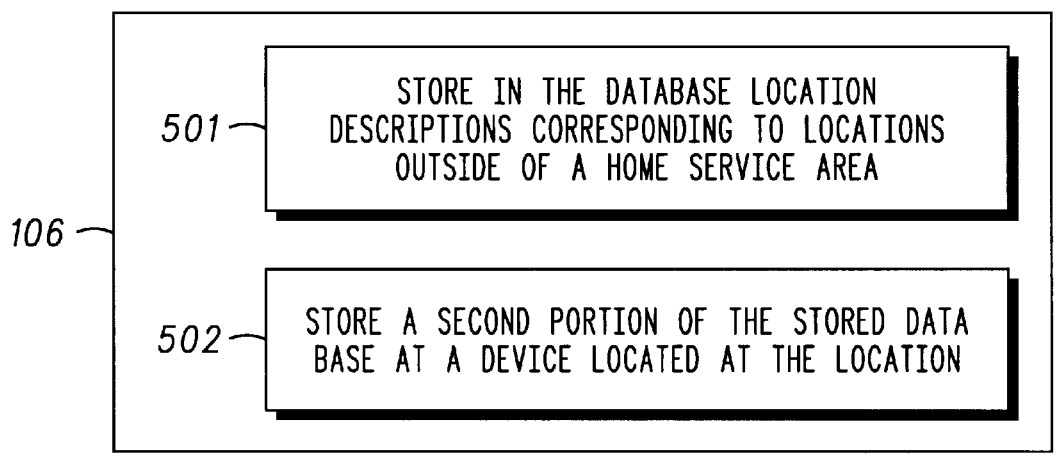
FIG. 5 is a diagram illustrating optional embodiments of step 106 of FIG. 1.

FIG. 5 is a diagram illustrating optional embodiments of step 106 of FIG. 1. Step 501 illustrates an embodiment of the step of storing the at least a portion of the stored database at the database server located remotely from the location. In step 501, location descriptions corresponding to locations outside of a home service area are stored in the stored database.

Step 502 illustrates an embodiment of the step of storing the at least a portion of the stored database at the database server located remotely from the location. In step 502, a second portion of the stored database is stored at a device located at the location.

Figure 6:
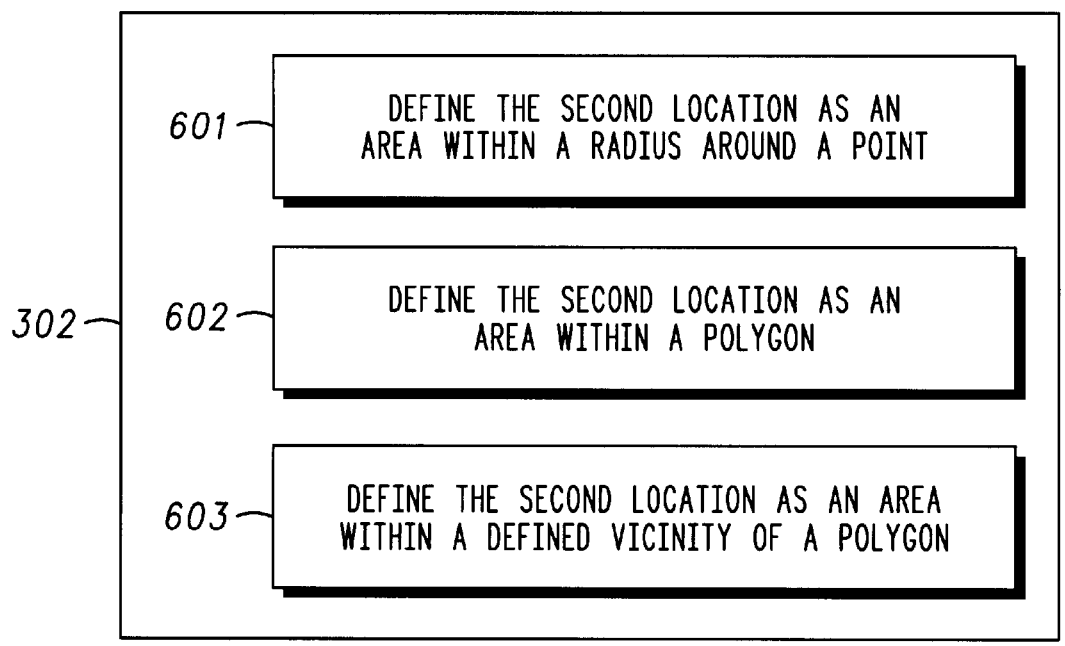
FIG. 6 is a diagram illustrating optional embodiments of step 302 of FIG. 3.

FIG. 6 is a diagram illustrating optional embodiments of step 302 of FIG. 3. Step 601 illustrates an embodiment of the step of determining the second location description of the location descriptions based on the user-supplied definition. In step 601, the second location is defined as an area within a radius around a point.

Step 602 illustrates an embodiment of the step of determining the second location description of the location descriptions based on the user-supplied definition. In step 602, the second location is defined as an area within a polygon. Thus, a "metes and bounds" approach may be used to define a location description for a location.

Step 603 illustrates an embodiment of the step of determining the second location description of the location descriptions based on the user-supplied definition. In step 603, the second location is defined as an area within a defined vicinity of a polygon. Such a definition is useful to define a location description to indicate that the user is "near" a certain facility or site.

Figure 7:
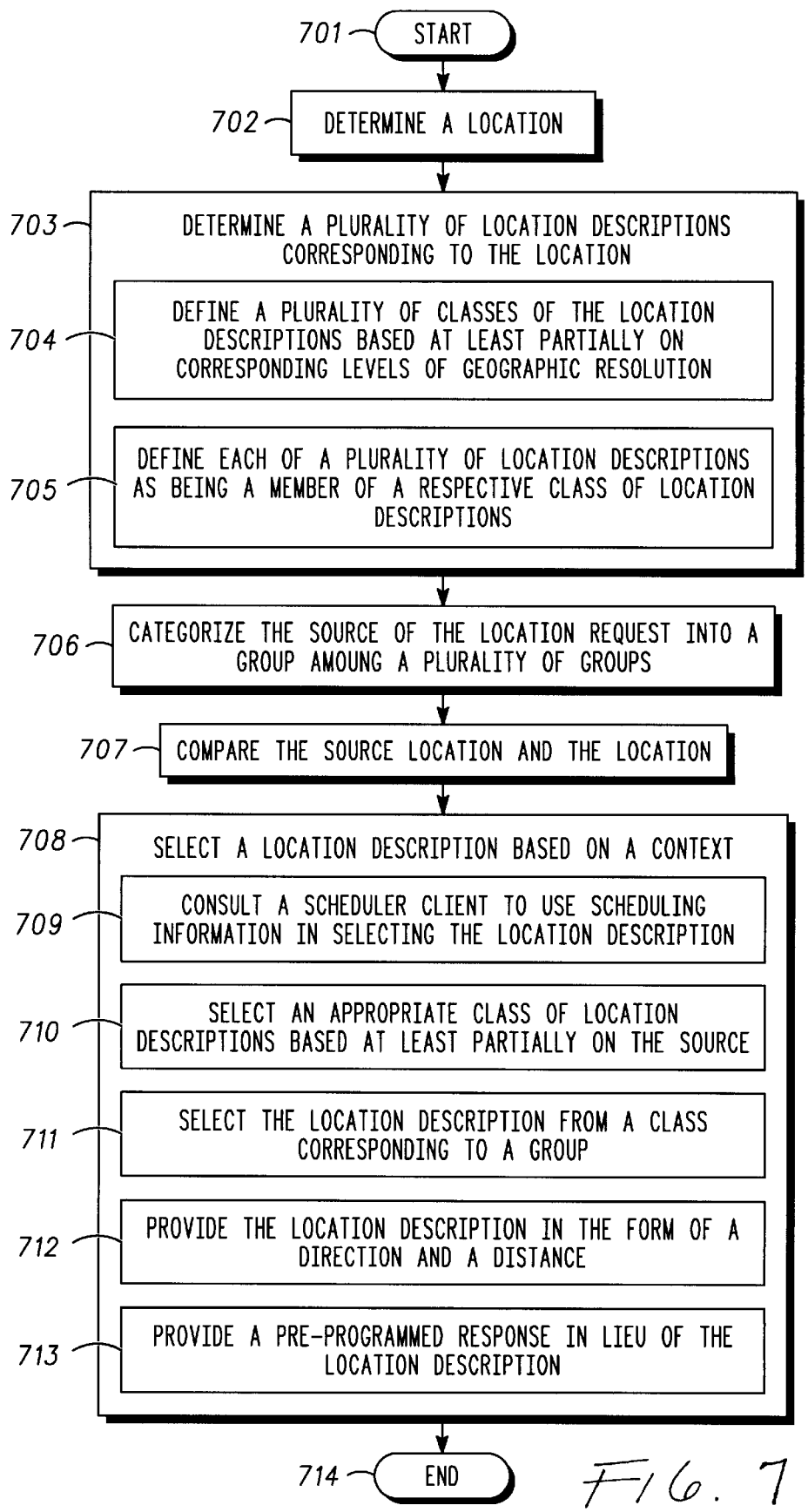
FIG. 7 is a flow diagram illustrating a method for providing a location description in accordance with an embodiment of the invention.

FIG. 7 is a flow diagram illustrating a method for responding to a location request in accordance with an embodiment of the invention. The method begins in step 701. In step 702, a location is determined. In step 703, a plurality of location descriptions corresponding to the location are determined. The location descriptions may have varying levels of geographic resolution. Step 703 may include steps 704 and/or step 705. In step 704, a plurality of classes of the location descriptions are defined based at least partially on the corresponding levels of geographic resolution associated with the location descriptions. In step 705, each of the plurality of location descriptions is defined as being a member of a respective class of location descriptions.

In step 706, the source of the location request is categorized into a group among a plurality of groups. A group of a source is matched against a class of a location description to determine the suitability of that location description for that source. If the group and the class do not match, the source will be provided with a location description of a class that does match their group.

In step 707, the source location and the location are compared. In step 708, a location description is selected based on a context. The context may include a source of the location request, a source location of the source of the location request, and a time of the location request. Step 708 may include step 709, step 710, step 711, step 712, and/or step 713. In step 709, a scheduler client is consulted to use scheduling information in selecting the location description. For example, if scheduling information provided by the scheduler client indicates that the user is on vacation, a location description indicating that the user is on vacation may be substituted for the location description that would normally be provided.

In step 710, an appropriate class of location descriptions is selected based at least partially on the source of the location request. Thus, a class of location descriptions most meaningful to the source of the location request may be provided. For example, a class of location descriptions understood within a particular corporate environment may be provided to co-workers, while a class of more generally understood location descriptions may be provided to family members. Similarly, when the user is attending a family activity, a class of more specific location descriptions meaningful to family members may be provided to family members, while a class of more generally understood location descriptions, such as a state, county, or city, may be provided to co-workers. This method may optionally be practiced in a manner such that more than one of the classes of location descriptions is defined at a same level of geographic resolution. Thus, the levels of geographic resolution need not be mutually exclusive among the classes of location descriptions.

In step 711, the location description is selected from a class corresponding to the group. In step 712, the location description is provided in the form of a direction and a distance. Such a location description is useful, for example, for locating a user when the user is within walking distance of the source of the location request.

In step 713, a pre-programmed response is provided in lieu of the location description. Alternatively, the location description may be manually programmed. The pre-programmed response may be independent of the location. For example, a location description may be programmed to indicate that the user is on vacation.

Figure 8:
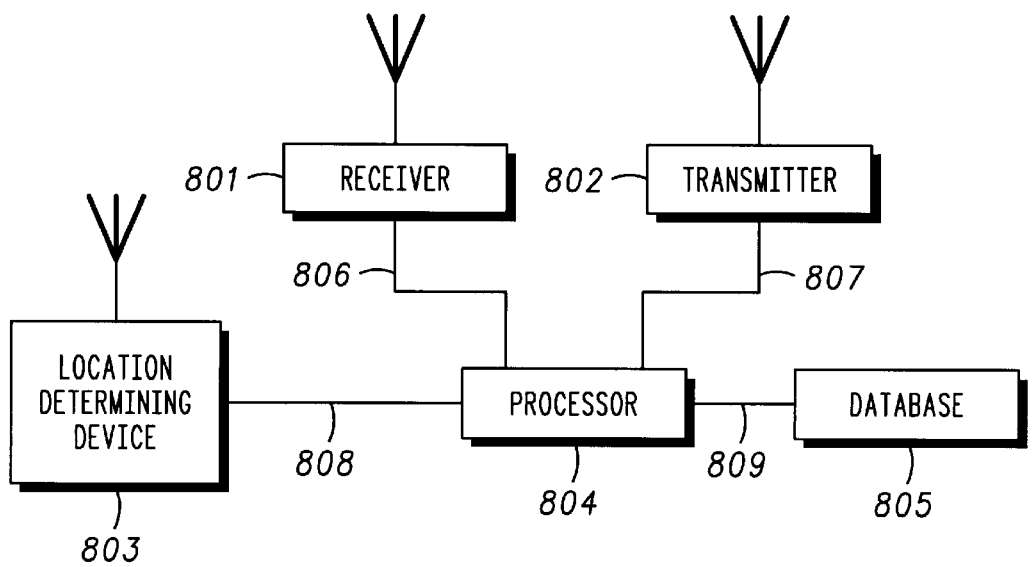
FIG. 8 is a block diagram illustrating an apparatus in accordance with an embodiment of the invention.

FIG. 8 is a block diagram illustrating an apparatus for responding to a location request in accordance with an embodiment of the invention. The apparatus includes receiver 801, transmitter 802, location determining device 803, processor 804, and database 805. Processor 804 is coupled to receiver 801, transmitter 802, location determining device 803, and database 805. Receiver 801 is configured to receive the location request from the source of location request. Location determining device 803 is configured to determine a location of the apparatus. For example, location determining device 803 may determine the location based on GPS or GLONASS signals. The database is configured to store location descriptions. Processor 804 is operatively coupled to receiver 801, location determining device 803, and database 805. Processor 804 is configured to select an appropriate location description from among the location descriptions. The appropriate location description corresponds to the location and is selected based on the source of the location request. Transmitter 802 is operatively coupled to processor 804 to transmit the appropriate location description to the source of the location request.

Optionally, processor 804 may select the appropriate location description based on a time of the location request. Optionally, receiver 801 receives a source location of the source and processor 804 selects the appropriate location description based on the source location of the source.

Figure 9:
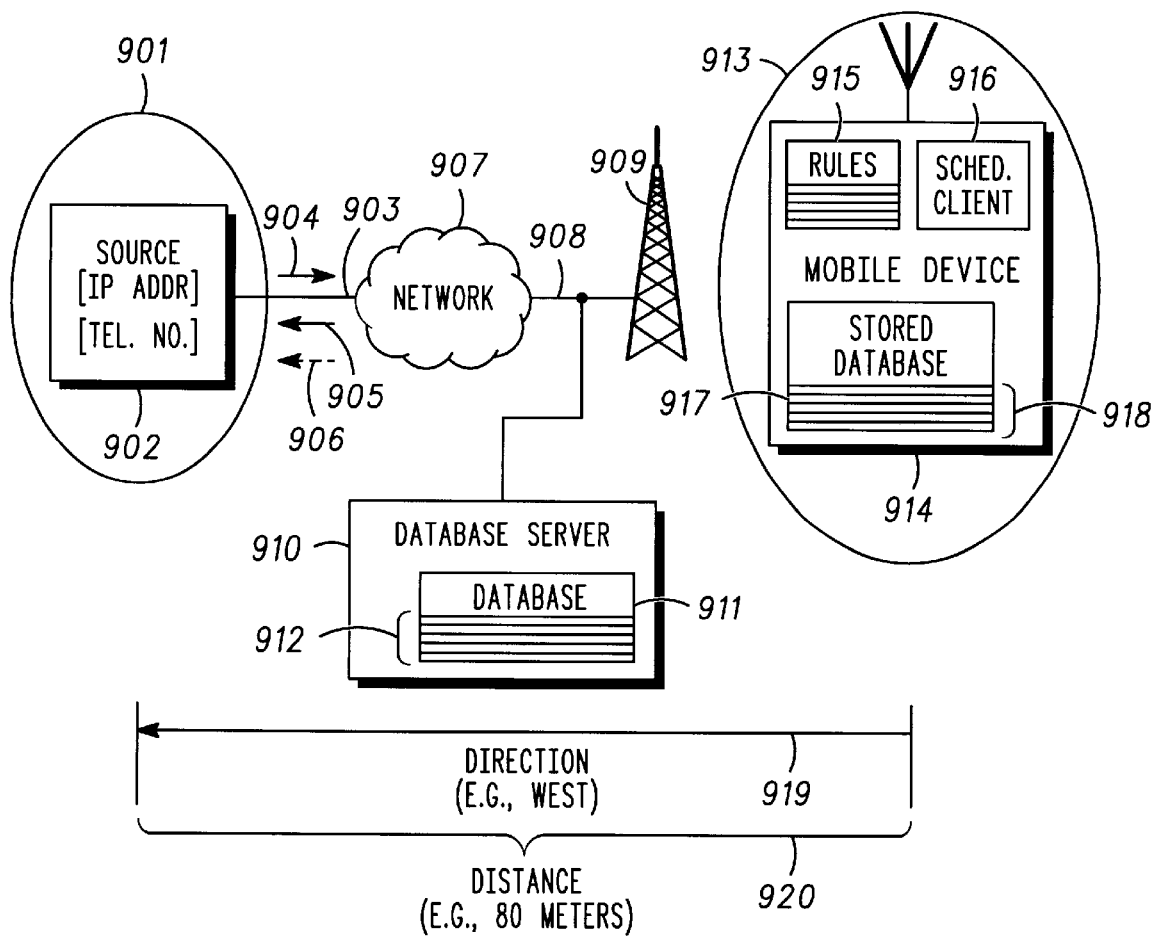
FIG. 9 is a block diagram illustrating a system in accordance with an embodiment of the invention.

FIG. 9 is a block diagram illustrating a system in accordance with an embodiment of the invention. The system includes source 902 at source location 901, network 907, database server 910 including database 911, base station 909, and mobile device 914 at location 913. Source 902 is coupled to network 907 via coupling 903. Network 907 is coupled to database server 910 and base station 909 via coupling 908. The database 911 of database server 910 is located remotely from the mobile device 914. The database 911 includes location descriptions 912. Base station 909 is coupled to the mobile device 914 via a medium, for example using a wireless communication technique.

Source 902 generates a location request 904 to mobile device 914 or database server 910 via the intervening elements. Source 902 may also include a source location or other source information with the location request. For example, the source 902 may provide an internet protocol (IP) address or a telephone number to identify source 902. Mobile device 914 and database server 910 are operatively coupled to the source 902 such that mobile device 914 or database server 910 receives the location request, determines a location of the mobile device, selects a location description 905 from among a plurality of location descriptions, and provides the location description 905 to source 902. Optionally, mobile device 914 or database server 910 may provide a different location description 906 to source 902. Mobile device 914 includes rules 915, scheduling client 916, and stored database 917. Stored database 917 includes location descriptions 918.

Optionally, the location description may be selected based on the source. Optionally, the location description may be selected based on a time of the location request. Optionally, the location description may be selected based on a source location at which the source is located. Optionally, the mobile device selects the location description from a database of location descriptions stored within the mobile device. A location description may be provided in terms of a direction 919 and a distance 920.

Figure 10:
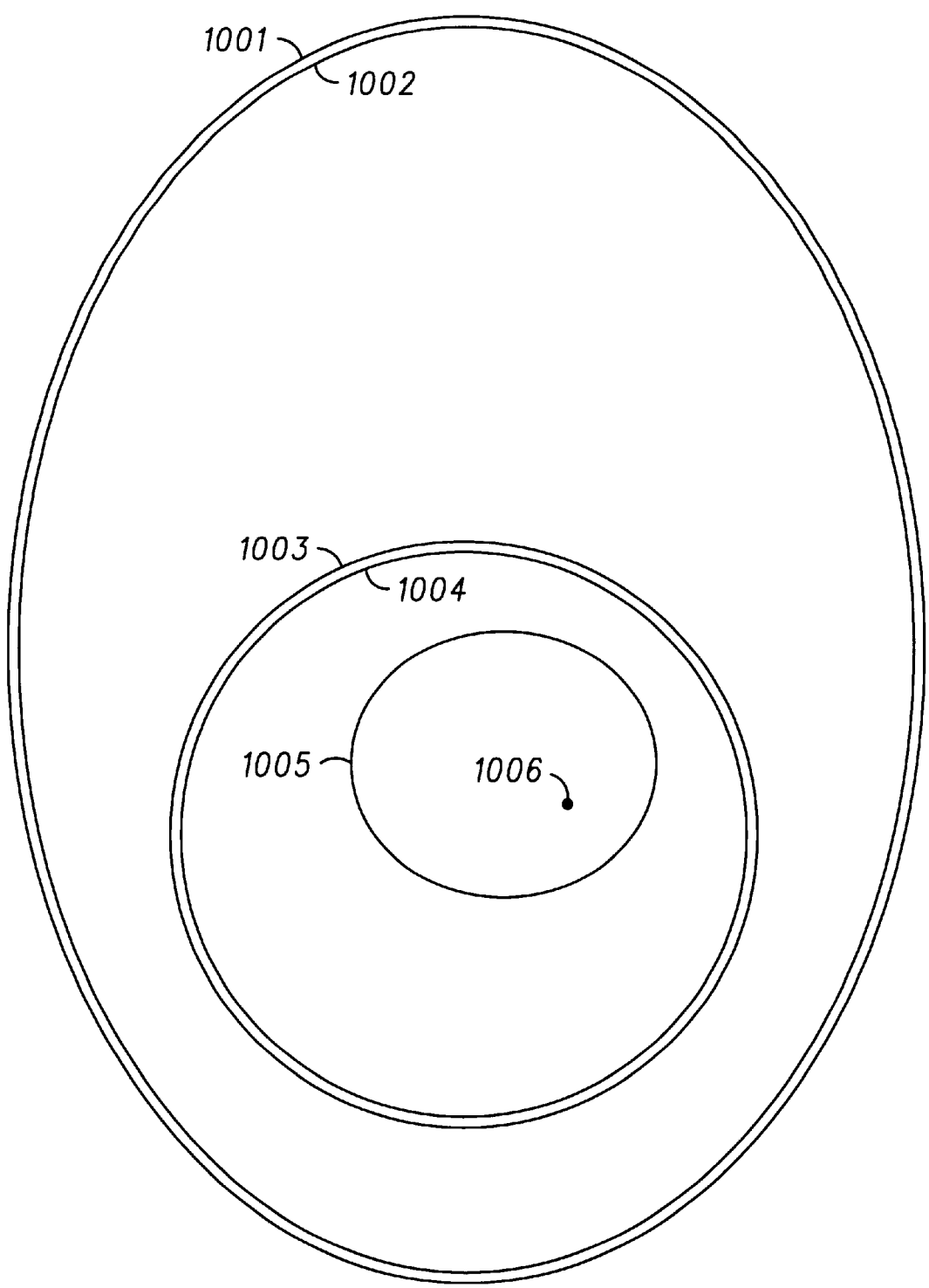
FIG. 10 is a set diagram illustrating a plurality of groups within which sources may be classified in accordance with an embodiment of the invention.

FIG. 10 is a set diagram illustrating a plurality of groups within which sources may be classified in accordance with an embodiment of the invention. The plurality of groups include group 1004, group 1005, and a group defined between outer limit 1002 and inner limit 1003. Universe 1001 includes all sources. In one example, unrecognized sources are classified as being in the group defined between outer limit 1002 and inner limit 1003, recognized sources are classified as being in group 1004, and trusted sources are classified as being in group 1005. Source 1006 is an example of a recognized and trusted source.

Figure 11:
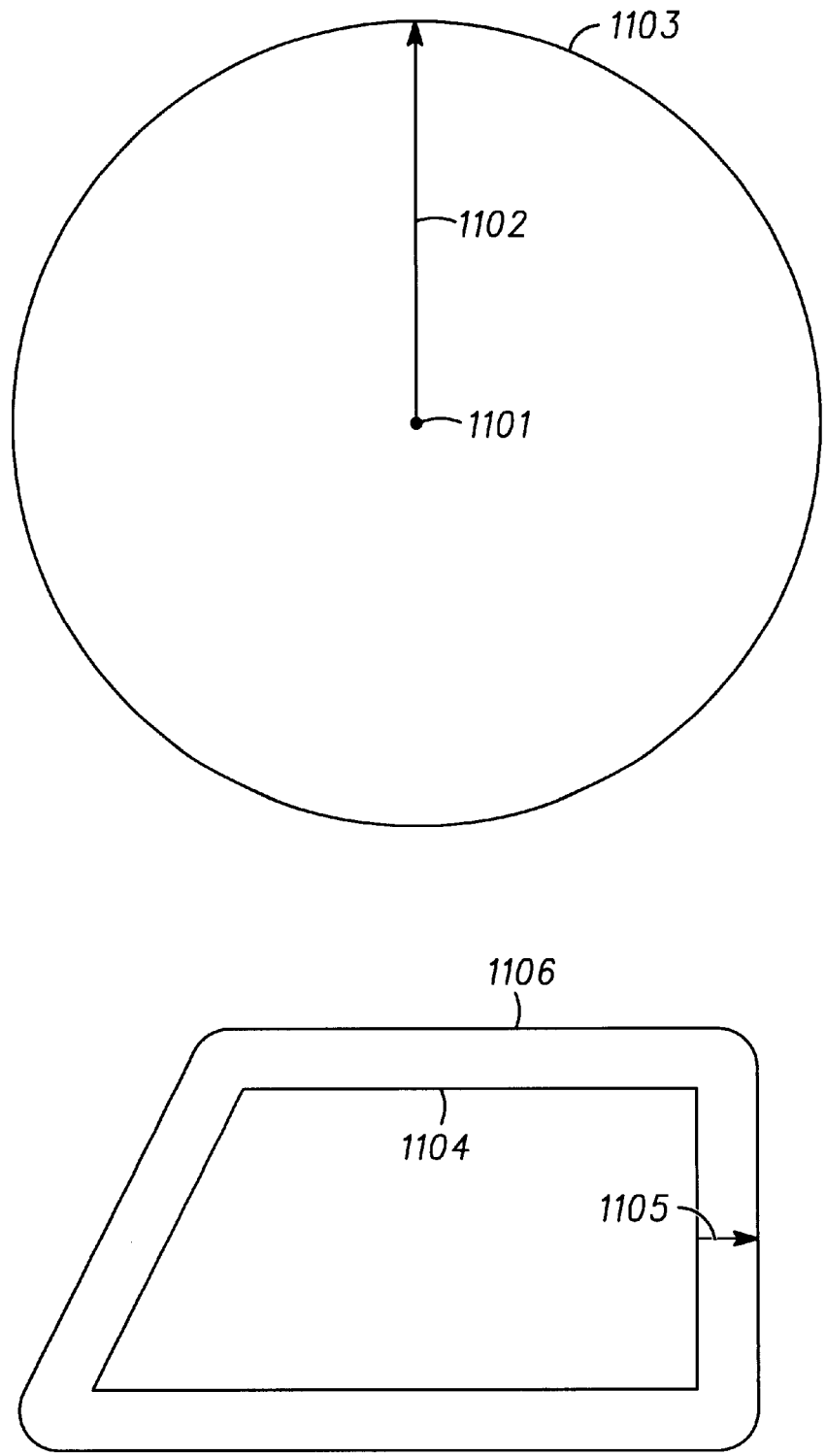
FIG. 11 is a diagram illustrating areas defined within a radius of a point, within a polygon, or within a defined vicinity of a polygon in accordance with embodiments of the invention.

FIG. 11 is a diagram illustrating areas defined within a radius of a point, within a polygon, or within a defined vicinity of a polygon in accordance with embodiments of the invention. Area 1103 is defined as being within radius 1102 of point 1101. Polygon 1104 defined the area within the polygon. Area 1106 is defined as being within a distance 1105 of polygon 1104.

Figure 12:
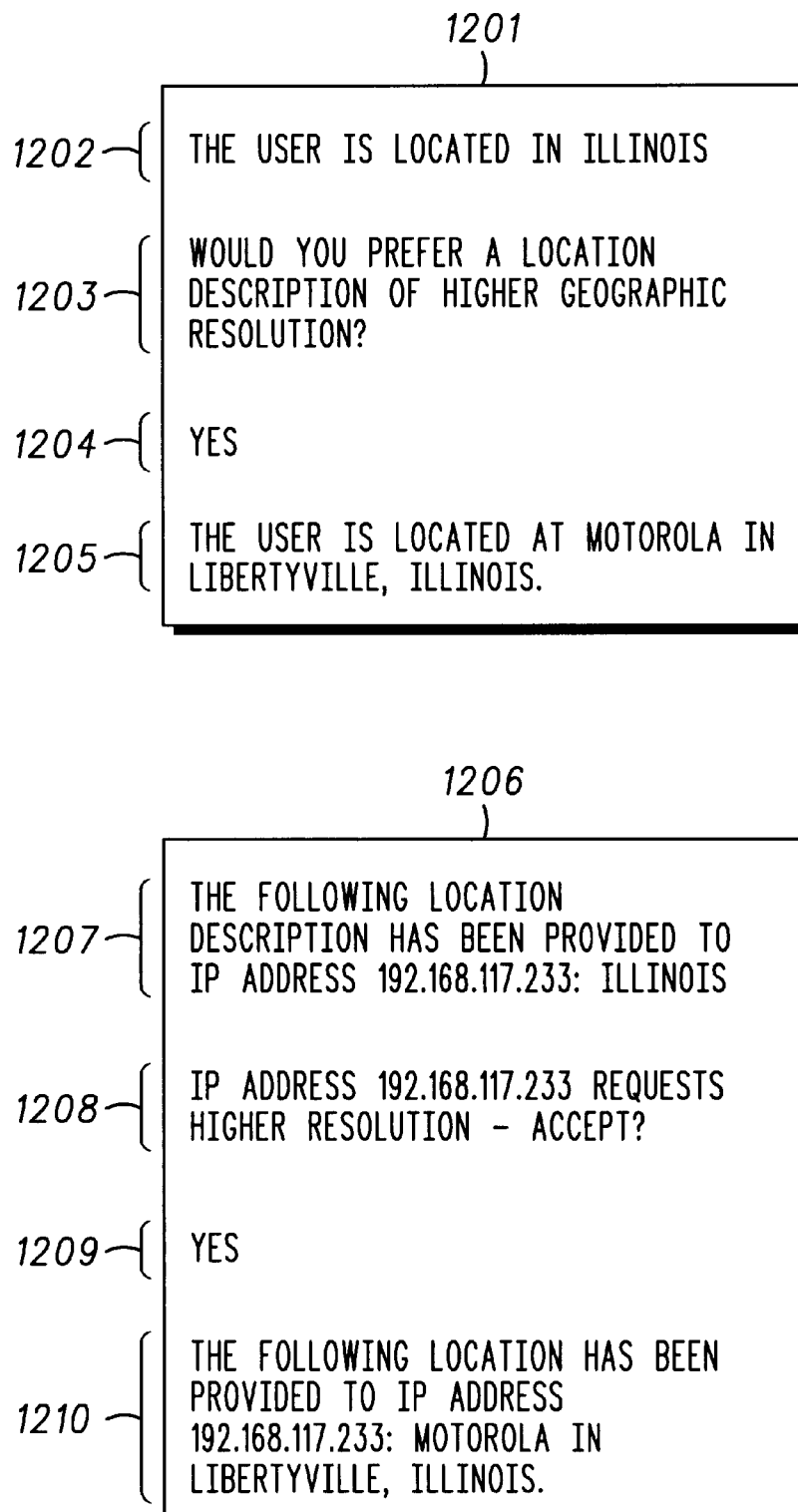
FIG. 12 is a diagram illustrating communications with a source and with a device situated at a location in accordance with an embodiment of the invention.

FIG. 12 is a diagram illustrating communications with a source and with a device situated at a location in accordance with an embodiment of the invention. Communication 1201 occurs with the source of the location request. Location description 1202 is provided to the source of the location request. Prompt 1203 is provided to the source of the location request to invite the source to issue an override request. Override request 1204 is received from the source. Different location description 1205 is provided to the source.

Communication 1206 occurs with the device situated at the location. Notice 1207 is provided to the device that a location description 1202 has been given to the source. Override request 1208 is communicated to the device. User election 1209 is received at the device from the user of the device. Notice 1207 is provided to the device that a different location description 1205 has been given to the source.

Figure 13:
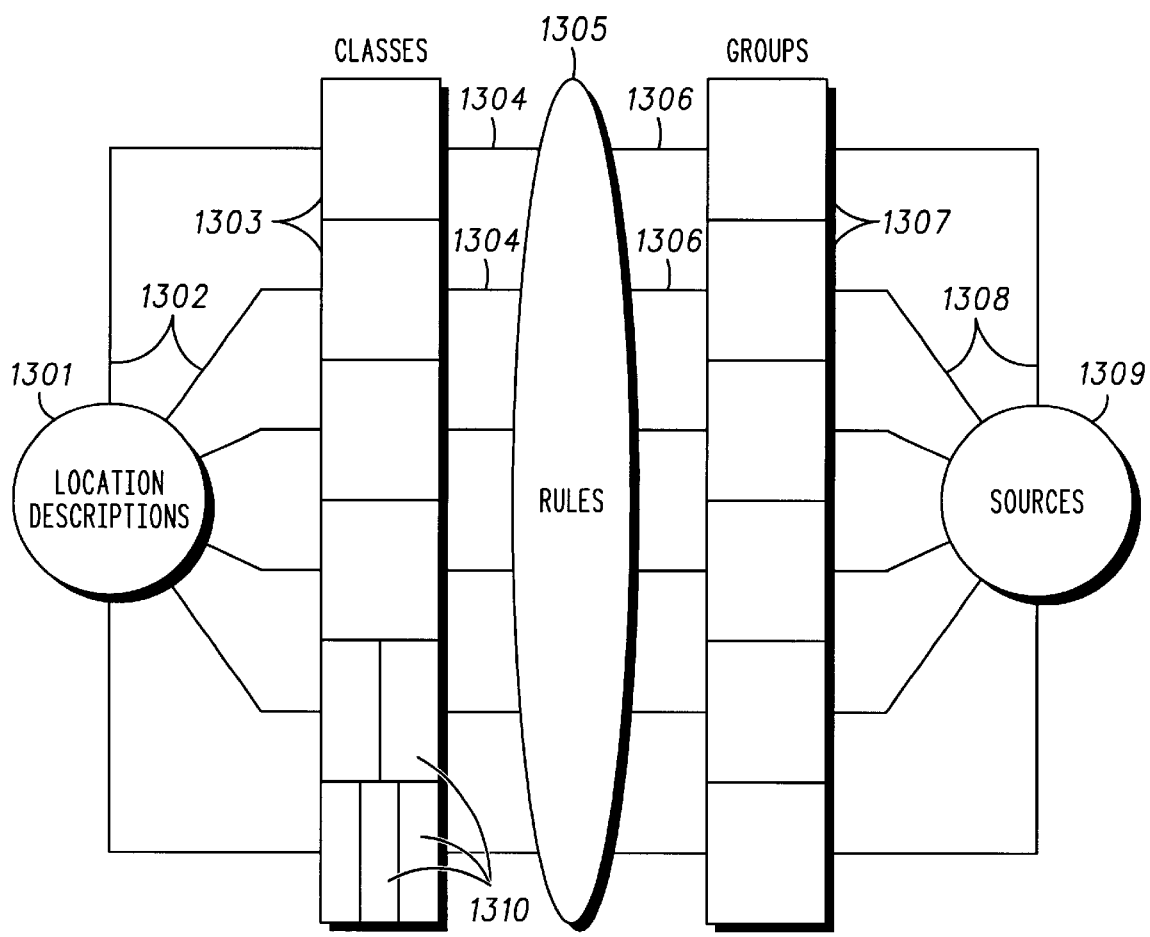
FIG. 13 is a diagram illustrating a relationship between location descriptions, classes, rules, groups, and sources in accordance with an embodiment of the invention.

FIG. 13 is a diagram illustrating a relationship between location descriptions, classes, rules, groups, and sources in accordance with an embodiment of the invention. Location descriptions 1301 are defined as being members of classes 1303 according to divisions 1302. Some or all of classes 1303 may include user-defined sub-classes 1310. Sources 1309 are defined as being members of groups 1307 according to divisions 1308. Rules 1305 are applied to classes 1303 according to links 1304 and to groups 1307 according to links 1306.

Figure 14:
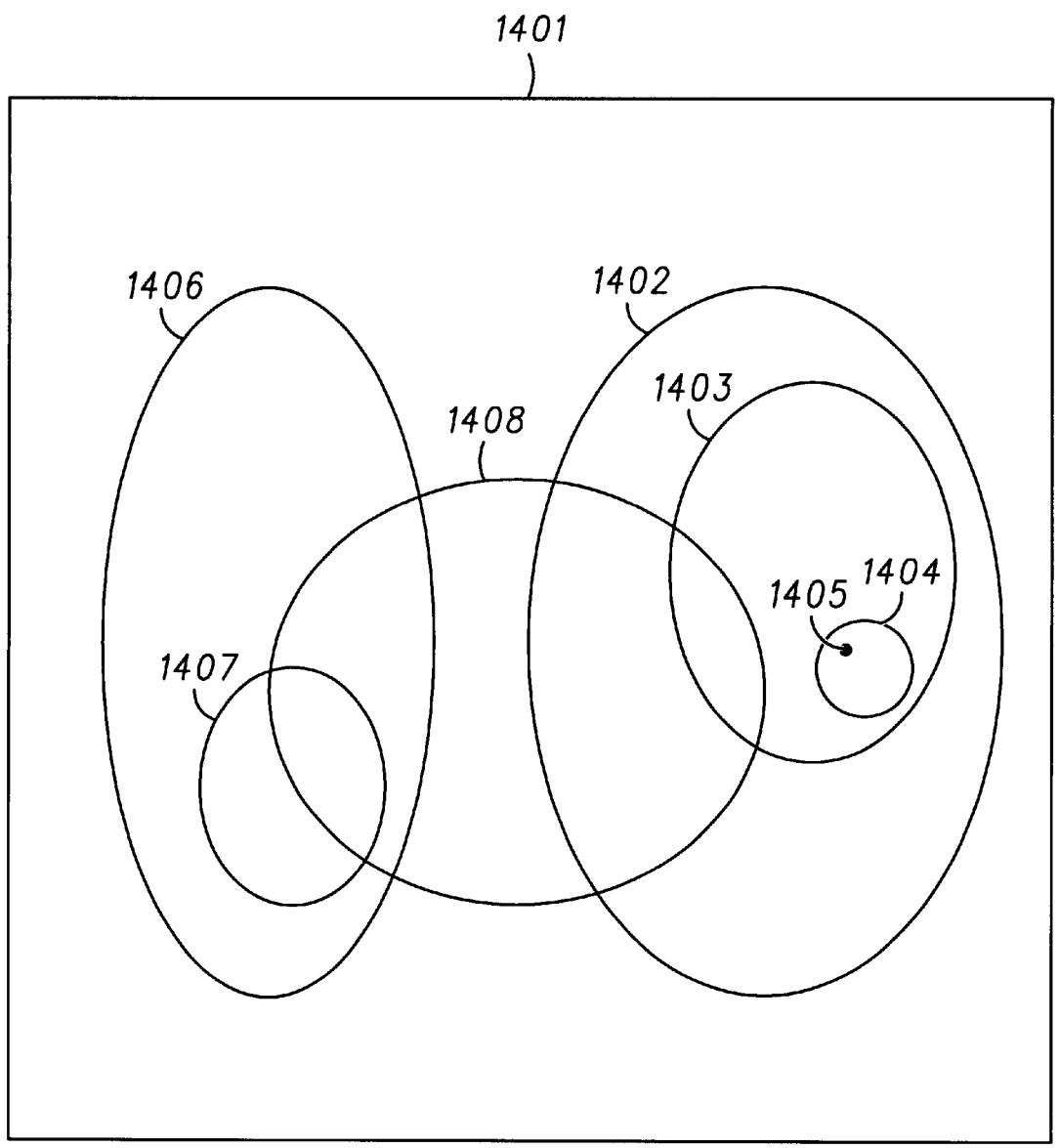
FIG. 14 is a diagram illustrating a relationship between location descriptions having varying levels of geographic resolution in accordance with an embodiment of the invention.

FIG. 14 is a diagram illustrating a relationship between location descriptions having varying levels of geographic resolution in accordance with an embodiment of the invention. Universe 1401 includes all locations. Location 1405 lies within location descriptions 1404, 1403, and 1402. Location description 1404 is a subset of location description 1403, which is a subset of location description 1402. Other locations may lie within location description 1407, which is a subset of location description 1406. Other locations may lie within location description 1408, which includes portions of location descriptions 1402, 1403, 1406, and 1407. Other locations may lies within different location descriptions.

Accordingly, a method and apparatus for providing location information has been described. It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for responding to a location request comprising the steps of:

determining a source of the location request based on voice recognition of the source;

determining a location;

determining a plurality of location descriptions corresponding to the location, the location descriptions having varying levels of geographic resolution;

selecting a location description from the plurality of location descriptions based on the source of the location request; and providing the location description to the source of the location request.

2. The method of claim 1 wherein the step of selecting a location description based on the source of the location request further comprises the steps of:

classifying the source of the location request as belonging to a group from among a plurality of groups; and selecting a location description based on the group to which the source of the request belongs.

3. The method of claim 2 wherein the step of classifying the source of the request as belonging to a group from among a plurality of groups further comprises the step of:

classifying unrecognized sources of location requests to an unrecognized source group.

4. The method of claim 3 wherein the step of classifying the source of the request as belonging to a group from among a plurality of groups further comprises the step of:

classifying at least one recognized source to at least one recognized source group.

5. The method of claim 4 wherein the step of classifying the source of the request as belonging to a group from among a plurality of groups further comprises the step of:

classifying the at least one recognized source to at least one subset group that is a subset of the recognized source group.

6. The method of claim 1 wherein the step of selecting a location description based on the source of the location request further comprises the step of:

selecting the location description based on the source of the location request and a time of the location request.

7. The method of claim 1 wherein the step of selecting a location description based on the source of the location request further comprises the step of:

applying rules to select the location description.

8. The method of claim 1 wherein the step of selecting the location description based on the source of the location request further comprises the step of:

when the source of the location request is an emergency operator, selecting the location description providing the most precise level of geographic resolution.

9. A method for responding to a location request comprising the steps of:

determining a source of the location request;

determining a location;

determining a plurality of location descriptions corresponding to the location, the location descriptions having varying levels of geographic resolution;

selecting a location description from the plurality of location descriptions based on the location;

selecting a source location of the source of the location request;

selecting a limitation of a stored database; and providing the location description to the source of the location request.

10. The method of claim 9 wherein the step of determining the source of the location request is based on an IP address of the source of the location request.

11. The method of claim 9 wherein the step of determining the source of the location request is based on a cryptographically signed request.

12. The method of claim 9 wherein the step of determining the source of the location request is based on a telephone number of the source of the location request.

13. The method of claim 9 wherein the step of selecting a limitation of a stored database further comprises the step of:

if the limitation of the stored database prevents the selecting of the location description of a desired level of geographic resolution, selecting the location description of lesser geographic resolution.

14. The method of claim 9 further comprising the step of:

storing the stored database at a device located at the location.

15. The method of claim 9 further comprising the step of:

storing at least a portion of the stored database at a database server located remotely from the location.

16. The method of claim 15 wherein the step of storing the at least a portion of the stored database at the database server located remotely from the location further comprises the step of:

storing in the stored database location descriptions corresponding to locations outside of a home service area.

17. The method of claim 16 wherein the step of storing the at least a portion of the stored database at the database server located remotely from the location further comprises the step of:

storing a second portion of the stored database at a device located at the location.

18. A method for responding to a location request comprising the steps of:

determining a source of the location request;

determining a location;

determining a plurality of location descriptions corresponding to the location, the location descriptions having varying levels of geographic resolution;

determining at least one of the location descriptions from the plurality of location descriptions based on politically-defined geographic descriptions;

determining a second location description of the location descriptions based on a user-supplied definition, the second location description corresponding to a second location;

defining the second location as one of an area within a polygon and an area within a defined vicinity of a polygon;

selecting a location description based on the source of the location request; and providing the location description to the source of the location request.

19. A method for responding to a location request comprising the steps of:

determining a source of the location request;

determining a location;

determining a plurality of location descriptions corresponding to the location, the location descriptions having varying levels of geographic resolution;

selecting a location description from the plurality of location descriptions based on the source of the location request;

providing the location description to the source of the location request;

receiving from the source of the location request an override request;

obtaining a user election regarding the override request; and when the user election indicates acceptance of the override request, providing a different location description at a different level of geographic resolution to the source of the location request.

20. The method of claim 19 further comprising the step of:
when the source of the location request is unrecognized, prompting the source of the location request for the override request.

21. A method for responding to a location request comprising the steps of:
determining a source of the location request;
determining a location;
determining a plurality of location descriptions corresponding to the location, the location descriptions having varying levels of geographic resolution;
selecting a location description from the plurality of location descriptions based on the source of the location request by;
obtaining a user election regarding overriding a nominal location description; and
when the user election indicates an intent of overriding the nominal location description, providing a different location description at a different level of geographic resolution to the source of the location request;
providing the location description to the source of the location request; and
establishing a connection with the source of the location request, the connection initiated by a user at the location,
wherein the step of determining the source of the location request further comprises the step of:
determining the source of the location request based on the connection.

22. A method for responding to a location request comprising the steps of:
determining a location;
determining a plurality of location descriptions corresponding to the location, the location descriptions having varying levels of geographic resolution; and
selecting a location description based on a context, the context including a source of the location request, a source location of the source of the location request, and a time of the location request.

23. The method of claim 22 wherein the step of selecting the location description based on the context further includes the step of:
consulting a scheduler client to use scheduling information in selecting the location description.

24. The method of claim 22 wherein the step of selecting the location description based on the context further includes the step of:
providing a pre-programmed response in lieu of the location description.

25. The method of claim 24 wherein the pre-programmed response is independent of the location.

26. The method of claim 22 further comprising the step of:
comparing the source location and the location, wherein the step of selecting the location description based on the context further includes the step of:
providing the location description in the form of a direction and a distance.

27. The method of claim 22 wherein the step of determining the plurality of location descriptions corresponding to the location further comprises the step of:
defining a plurality of classes of the location descriptions based at least partially on the corresponding levels of geographic resolution associated with the location descriptions.

28. The method of claim 27 wherein the step of selecting the location description based on the context further includes the step of:
selecting an appropriate class of location descriptions based at least partially on the source of the location request.

29. The method of claim 28 wherein more than one of the classes of geographic descriptors are defined at a same level of geographic resolution.

30. The method of claim 27 wherein the step of determining the plurality of location descriptions corresponding to the location further comprises the step of:
defining each of the plurality of location descriptions as being a member of a respective class of location descriptions.

31. The method of claim 27 further comprising the step of:
categorizing the source of the location request into a group among a plurality of groups, wherein the step of selecting the location description corresponding to the location further includes the step of:
selecting the location description from a class corresponding to the group.

32. An apparatus for responding to a location request the apparatus comprising:
a receiver configured to receive the location request from a source of location request;
a location determining device configured to determine a location of the apparatus;
a data base configured to store location descriptions;
a processor operatively coupled to the receiver, the location determining device, and the data base, the processor configured to select an appropriate location description from among the location descriptions, the appropriate location description corresponding to the location and selected based on the source of the location request; and
a transmitter operatively,coupled to the processor to transmit the appropriate location description to the source of the location request;
wherein the receiver receives a source location of the source and the processor selects the appropriate location description based on the source location of the source.

33. The apparatus of claim 32 wherein the processor selects the appropriate location description based on a time of the location request.

34. A system for selectively providing location descriptions, the system comprising:
a source, the source generating a location request; and
a mobile device operatively communicating with the source to receive the location request, to determine a location of the mobile device, to select a location description from among a plurality of location descriptions, and to provide the location description to the source;
wherein the location description is selected based on a source location at which the source is located.

35. The system of claim 34 wherein the mobile device selects the location description from a data base of location descriptions stored within the mobile device.

36. The system of claim 34 further comprising:
a data base located remotely from the mobile device, the data base storing the location descriptions and operatively communicating the location description with the mobile device.

* * * * *